3,140,318
PROCESS FOR THE PRODUCTION OF PHENOL OF HIGH DEGREE OF PURITY
Heinrich Sodomann and Bruno Hauschulz, both of Gladbeck, Westphalia, and Hans Schwermer, Wanne-Eickel, Westphalia, Germany, assignors to Phenolchemie G.m.b.H., Gladbeck, Germany, a German corporation
No Drawing. Filed Feb. 9, 1960, Ser. No. 7,524
Claims priority, application Germany Feb. 11, 1959
3 Claims. (Cl. 260—621)

This invention relates to new and useful improvements in the production of substantially pure phenols.

When phenol is produced by acid cleavage of cumenehydroperoxide, a raw product is obtained which may be transformed into a substantially pure phenol by various known processes, mostly of the distillation type. Thus, for example, the phenol may be admixed with hexane and water admixed with the phenol-hexane mixture. The resulting mixture separates out into two layers. The phenol-containing layer is subjected to distillation, the water being vaporized and the major portion of the phenol remaining behind in the distillation equipment as a residue. Further, it is known to submit the decomposition product of the acid cleavage of cumenehydroperoxide, after first neutralizing the same, to a fractional distillation. The phenol-containing residue recovered is then extracted with an aqueous solution of sodium hydroxide. The aqueous phase is separated off, and the phenol is recovered from the aqueous sodium-phenolate solution through acid treatment. It is also known to separate phenol from cumene-phenol mixtures containing the same by extraction with hot water. This procedure is carried out by adding water to the cumene-phenol mixture to be treated, and distilling off the cumene in azeotropic mixture with the water. In this procedure it is necessary to ensure that in the still there is maintained between the water and cumene a ratio of at least 0.5:1 (water:cumene).

These processes, by which fairly satisfactory results of purity of phenol are achieved, are, however, for the most part very costly in practice. One of the reasons for this high cost lies in the fact that the water phases in each instance hold in solution appreciable quantities of phenol. Various methods for reducing the ultimate loss of phenol have been developed and, while recovery processes have been reported, these methods still allow more or less phenol to be carried off with the water.

It has also been suggested to contact phenols conventionally designated as sulfur-tar phenols at temperatures of between 100–250° C. with solid alkali containing oxidic iron compounds and thereafter subjecting the same in admixture with water in liquid state to an azeotropic distillation. Following the distillation, an acid treatment may be carried out.

It has also already been proposed to purify crude phenols through treatment of the phenol mixture with solid acid salts, i.e. salts of strong polybasic inorganic acids, as for instance sodium chloride, which causes most of the phenol to separate, but, as previously mentioned in connection with other procedures, after this procedure the water phase holds in solution appreciable quantities of phenol, the ultimate loss of phenol representing an economic loss which cannot be overlooked.

According to other suggestions, salting out may also be effected with acid condensation agents, such as for example strong mineral acids, etc., wherein, if necessary, the treatment may be carried out in the presence of aromatic hydrocarbons. The phenols charged in these last mentioned processes are not produced through the acid cleavage of organic hydroperoxides, but in an entirely different manner and from entirely different starting materials. Accordingly, these phenols are not contaminated by the same impurities and, in particular, are not contaminated with α-methylstyrene and mesityloxide, so that the known processes, not directed to removal of these impurities, cannot be used to purify the phenol produced from cumene.

If the phenol derived from an acid cleavage of cumenehydroperoxide is to be used, for example, as starting material for a chlorinated phenol or for the preparation of hydroxyaryl-substituted propanes, such as 2,2′-bis(p-hydroxyphenyl)-propane, then it has been established that the degrees of purity obtained with the hitherto known processes are not satisfactory, since even slight traces of impurities may severely disturb the results of the processes in which the compounds, i.e. chlorinated phenols, etc., are subsequently employed.

In addition to mesityloxide and α-methylstyrene, dimethylphenyl-carbinol, 2-methylcoumarone, acetophenone and a number of other substances not yet specifically identified, and in particular $C_6$-materials, constitute contaminants of the phenol. These substances do not lend themselves to separation by distillation procedures.

One object of this invention is an effective and economical process for the purification of phenols, which phenols have been obtained by acid cleavage of a hydroperoxide of an alkyl-aromatic compound.

A further object of this invention is an effective and economical process for the purification of phenols by separation therefrom of mesityloxide and α-methylstyrene.

Still another object of this invention is an effective and economical process for the purification of phenols by separation therefrom of mesityloxide, α-methylstyrene, dimethylphenylcarbinol, 2-methylcoumarone, acetophenone, etc.

These and still further objects will become apparent from the following description.

In accordance with the invention, it has surprisingly been discovered that phenols, produced by acid cleavage of a hydroperoxide of an alkyl-aromatic hydrocarbon of a high degree of purity, can be obtained if the phenol is first subjected to a distillation and thereafter the phenol is subjected to treatment with small quantities of an acid, and the acidified phenol is redistilled. The quantities of acid employed in the acidification lie between 0.05 and 1% by weight, referred to the product to be purified. In general, acid quantities of 0.1–0.2% by weight suffice to produce a significantly improved purification. As acids, there are preferably employed inorganic acids and particularly sulfuric acid, preferably in concentrated form. Also suitable are, for example, hydrochloric acid, phosphoric acid, strong organic acids and in particular benzolsulfonic acid, toluol-sulfonic acid, etc., as well as substituted sulfonic acids, such as for example p-chlorosulfonic acid, which have proved eminently suitable.

The distillation of the phenol may be effected in customary manner. It is generally preferable to operate thus, that first a crude phenol mixture is prepared from the phenol-containing decomposition mixture formed in the hydroperoxide cleavage, after neutralization of the mixture in one or more stages, by distilling off from the mixture the constituents having lower boiling point than phenol. Thereafter, the phenol is subjected to an acid treatment, in accordance with the invention, and the acidified phenol mixture is preferably neutralized. The phenol obtained still contains certain low-boiling materials, which originate from side-reactions arising during the preceding distillation and acid treatment, whose precise identity is not yet completely established, as well as materials having higher boiling points than phenol and mostly of a tarry nature. In order to remove these impurities, the phenol is once more subjected to distillation. The distillate obtained is the substantially pure phenol. The distillation can be carried out at pressures ranging from normal up to about 10 atmospheres.

Advantageouslyy, the distillation is effected by charging the starting crude phenol a little below the head of the column and removing the pure phenol in vapor form as a lateral flow from a point positioned in the lower part of the column. This method of operation results in achieving a complete separation of the phenol from the low-boiling components (drawn off via the head) and from the high-boiling components (remaining in the sump), thereby obtaining a phenol of a high degree of purity in one single column. Very surprisingly and unexpectedly, an extremely small quantity of the phenol is entrained and carried over with the distilling mixture.

The effectiveness of the process in accordance with the invention is, however, not limited to the operation just described for treatment of the crude phenol. Additionally, the quality of a substantially pure phenol produced in the known manner by acid cleavage of a alkyl aromatic hydroperoxide (e.g. isopropylbenzolhydroperoxide) and a following distillation process may be substantially improved by subjecting the same to the additional acid treatment. This is also the case if, in the distillation in accordance with the invention according to the process above described, the acid treatment is carried out only at the completion of the process. However, in this instance, preferably after the acid treatment, a further distillation is effected to ensure that any impurities incident to the acid treatment are eliminated.

The purification step is effected in the manner that the phenol to be treated is supplied to a suitable mixing vessel, for example a stirring vessel. There is then added to the phenol, based on the quantity of phenol to be treated, the quantity of concentrated acid necessary to effect the degree of acidification required for the purification. The mixing vessel is advantageously provided with stirrer means, so that an intimate mixing of the components can take place. Reaction times for the acidification of from between 1–4 hours are preferably employed. The treatment time is dependent in each case on the acid quantities and/or acid concentrations thereof employed, and the temperature applied. Thus, it has been established that, with higher temperatures and/or increased acid quantities and/or acid concentrations thereof, a shorter reaction time suffices and vice versa. The temperatures of the treatment are preferably selected so that the phenol to be treated is liquid at the treatment temperature and that preferably they fall within the range of about 90–170° C.

It is generally desirable to neutralize the phenol, following the acid treatment, in order to avoid losses of phenol which may occur at the high temperatures of the subsequent distillation through side-reactions of the phenol with the acid. Additionally, if neutralization is carried out, the use of materials resistant to corrosion for the distillation becomes superfluous. The neutralization may, for example, be carried out in a further stirring vessel. Preferably, the neutralization is effected with a finely pulverized alkaline acting agent, and in particular with alkali metal and/or alkaline earth hydroxides, carbonates or bicarbonates. The neutralization may also be effected employing solutions of these materials or can be, for example, carried out with gaseous ammonia or, additionally by means of ion exchangers, etc., however, because of the particularly good separation of the solid materials from the liquid phase, the neutralization with the finely pulverized substances is preferred.

After the crude phenol has been treated in the manner in accordance with the invention, there is subsequently effected the previously described distillation to recover the pure phenol. The phenol recovered from the distillation is substantially free of any of the contaminants originally contained in the phenol. The residue of the distillation comprises resinous reaction products, which are permeated with salts. As has already been observed in the process in accordance with the invention, the phenol losses are extraordinarily small and, as a rule, lie below 0.5%.

The process of the invention is not only applicable to the purification of phenol which is obtained from the acid cleavage of alkyl-aromatic hydroperoxide, as for example from isopropylbenzolhydroperoxide and diisopropylbenzol. In accordance with the invention, there can also be purified cresols obtained from methylisopropylbenzol or naphthols derived from isopropylnaphthalene.

The following examples illustrate the present invention without, however, restricting it thereto:

*Example 1*

1 kg. of phenol, prepared by the acid cleavage of isopropylbenzolhydroperoxide, was freed by distillation of constituents having a lower boiling point than the phenol. The phenol recovered was subjected to a further distillation, wherein constituents having a higher boiling point than the phenol and any possible constituents of lower boiling point were removed. The pure phenol was drawn off as a vaporous lateral flow. This phenol had a content of 2,000 mg. ketones, calculated as mesityloxide, as well as traces of other impurities and was treated with 1 g. of concentrated sulfuric acid in a stirring vessel. The mixture was stirred for two hours at 150° C. To the acidified mixture there was then added an amount equivalent to a slight excess with respect to the acid of a pulverized soda, and the mixture was further stirred for about 20 minutes. The resultant pH value of the mixture was 8. After separation of the soda, the reaction mixture was distilled. After taking off the first runnings, which amounted to about 5% and which were recycled to the crude phenol column, there was obtained a phenol product having less than 10 mg. ketones per kg., calculated as mesityloxide, and which contained substantially no other impurities. The purity of the phenol requirement was satisfactory with respect to any further processes requiring a substantially pure phenol for efficient results.

*Example 2*

1 kg. of phenol, obtained by the acid cleavage of isopropylbenzolhydroperoxide, was freed by distillation from constituents having a lower boiling point than the phenol and which still had a ketone content of 3,500 mg., calculated as mesityloxide, and which still contained some water, α-methylstyrene and traces of impurities, including certain low-boiling constituents. This phenol was then treated with 5 g. of concentrated sulfuric acid. The mixture was stirred for two hours at a temperature of about 120° C., and the acidified mixture was thereafter neutralized with a slight excess over the theoretically required amount of dry powdery soda, necessary to effect neutralization at the termination of the reaction. The mixture had a pH value of about 8. Distillation of this mixture resulted in the production, after taking off of first runnings of about 5%, of a phenol which contained less than 10 mg. ketones per kg., calculated as mesityloxide. This degree of purity of the phenol was satisfactory for any subsequent process requiring a substantially pure phenol.

*Example 3*

1 kg. of a crude phenol prepared by acid cleavage of isopropylbenzolhydroperoxide having a ketone content of 2,000 mg., calculated as mesityloxide, as well as traces of other impurities was treated with 1% by weight of 40% sulfuric acid. The mixture was stirred at a temperature of 90° C. at the reflux. After 6 hours had elapsed, the acidified phenol mixture was neutralized with finely pulverized soda until a pH value of 8 had been obtained. After taking off the first runnings of about 10%, which included the water introduced with the sulfuric acid, a phenol of a very high degree of purity was obtained, having a content of less than 50 mg. ketones per kg., calculated as mesityloxide.

*Example 4*

A crude phenol prepared by acid cleavage of isopropylbenzolhydroperoxide was tretaed with sulfuric acid in the manner described in Example 2. The acidified phenol was thereafter treated with various neutralization agents. Among those employed were aqueous solutions of sodium hydroxide having a content of from 1–40% NaOH, saturated solutions of calcium hydroxide, dry sodium carbonate, potassium carbonate, calcium oxide, calcium carbonate and magnesium oxide. It was demonstrated that all of these agents produced the same neutralization effect.

The distillation of the neutralized phenol produced a pure phenol having a pH value around 5. It was, however, found that the use of the solid materials had certain advantages, namely that the solid materials lend themselves to very simple and complete separation from the phenol, as for example by filtration.

While the invention has been described in detail with reference to the specific embodiments shown, various changes and modifications will become apparent to the skilled artisan which fall within the spirit of the invention and the appended claims.

We claim:
1. In the process of recovering substantially pure phenol from the phenol reaction product mixture produced in the acid cleavage of a hydroperoxide of an alkylaromatic hydrocarbon, the improvement of distilling the same, intimately mixing the separated phenol fraction with between 0.05 and 1% by weight based on the phenol mixture of an acid selected from the group consisting of inorganic and strong organic acids at a temperature within the range of about 70–170° C. for a period of about from 1–6 hours neutralizing the acidified phenol fraction, and thereafter subjecting the neutralized phenol fraction to a second distillation.

2. In the process of recovering substantially pure phenol from the phenol reaction product mixture produced in the acid cleavage of a hydroperoxide of an alkylaromatic hydrocarbon, the improvement of introducing said phenol reaction product mixture into a distillation zone somewhat below the head portion of said zone and withdrawing the phenol fraction in vapor form as a lateral flow from a lower portion of said distillation zone, the lower boiling components being withdrawn as an overhead fraction and the higher boiling components being recovered as a bottoms fraction, thereafter intimately mixing the separated phenol fraction with between 0.05 and 1% by weight based on the phenol mixture of an acid selected from the group consisting of inorganic and strong organic acids at a temperature within the range of about 90–170° C. for a period of about from 1–6 hours, neutralizing the acidified phenol fraction and subjecting the neutralized phenol fraction to a second distillation.

3. In the process of recovering phenol substantially free of alpha-methyl styrene and mesityloxide, the improvement of distilling the crude phenol, intimately mixing the phenol fraction recovered from the distillation with between 0.05 and 1% by weight based on the phenol mixture of an acid selected from the group consisting of inorganic and strong organic acids at a temperature within the range of about 90–170° C. for a period of about 1–6 hours neutralizing the acidified phenol fraction, and subjecting the neutralized phenol fraction to a second distillation.

References Cited in the file of this patent

UNITED STATES PATENTS

| | | |
|---|---|---|
| 2,113,951 | Shuman | Apr. 12, 1938 |
| 2,468,982 | Jansen | May 3, 1949 |
| 2,714,120 | Kehe | July 26, 1955 |
| 2,737,480 | Adams et al. | Mar. 6, 1956 |
| 2,910,511 | Joris | Oct. 27, 1959 |
| 3,029,292 | Nixon | Apr. 10, 1962 |
| 3,029,294 | Keeble | Apr. 10, 1962 |

UNITED STATES PATENT OFFICE
CERTIFICATE OF CORRECTION

Patent No. 3,140,318  
July 7, 1964

Heinrich Sodomann et al.

It is hereby certified that error appears in the above numbered patent requiring correction and that the said Letters Patent should read as corrected below.

Column 3, line 4, for "Advantageouslyy" read -- Advantageously --; column 5, line 37, for "70-170° C." read -- 90-170° C. --.

Signed and sealed this 17th day of November 1964.

(SEAL)  
Attest:

ERNEST W. SWIDER  
Attesting Officer

EDWARD J. BRENNER  
Commissioner of Patents